United States Patent
Lee

(10) Patent No.: US 10,579,289 B2
(45) Date of Patent: Mar. 3, 2020

(54) MEMORY MANAGEMENT METHOD FOR CONFIGURING SUPER PHYSICAL UNITS OF REWRITABLE NON-VOLATILE MEMORY MODULES, MEMORY CONTROL CIRCUIT UNIT AND MEMORY STORAGE DEVICE

(71) Applicant: PHISON ELECTRONICS CORP., Miaoli (TW)

(72) Inventor: Ming-Yen Lee, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 359 days.

(21) Appl. No.: 15/063,476

(22) Filed: Mar. 7, 2016

(65) Prior Publication Data
US 2017/0185337 A1 Jun. 29, 2017

(30) Foreign Application Priority Data
Dec. 28, 2015 (TW) .............................. 104144108 A

(51) Int. Cl.
*G06F 3/00* (2006.01)
*G06F 3/06* (2006.01)

(52) U.S. Cl.
CPC .......... *G06F 3/0629* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 8,954,694 B2 | 2/2015 | Tomlin et al. |
| 2012/0047409 A1* | 2/2012 | Post .................... G06F 11/1048 714/718 |

* cited by examiner

*Primary Examiner* — Reginald G Bragdon
*Assistant Examiner* — Michael L Westbrook
(74) *Attorney, Agent, or Firm* — JCIPRNET

(57) ABSTRACT

A memory management method, a memory control circuit unit and a memory storage device are provided. The method includes recording use information according to each physical erasing unit of a rewritable non-volatile memory module. The method also includes configuring a plurality of super physical units. An address offset value corresponding to a first unavailable physical programming unit of a first physical erasing unit in a first super physical unit is the same as an address offset value corresponding to a first available physical programming unit of a second physical erasing unit in the first super physical unit.

18 Claims, 9 Drawing Sheets

MEMORY MANAGEMENT METHOD FOR CONFIGURING SUPER PHYSICAL UNITS OF REWRITABLE NON-VOLATILE MEMORY MODULES, MEMORY CONTROL CIRCUIT UNIT AND MEMORY STORAGE DEVICE

CROSS-REFERENCE TO RELATED APPLICATION

This application claims the priority benefit of Taiwan application serial no. 104144108, filed on Dec. 28, 2015. The entirety of the above-mentioned patent application is hereby incorporated by reference herein and made a part of this specification.

BACKGROUND

Technology Field

The present invention relates to a memory management method and more particularly, to a memory management method, a memory control circuit unit and a memory storage device for a rewritable non-volatile memory module.

Description of Related Art

The markets of digital cameras, cellular phones, and MP3 players have expanded rapidly in recent years, resulting in escalated demand for storage media by consumers. Due to having characteristics, such as data non-volatility, low power consumption, compact size and no mechanical structure, the rewritable non-volatile memory module (e.g., a flash memory) is suitable for being built in the aforementioned portable multi-media devices listed for example.

Generally, in the management of physical erasing units in the re-writable non-volatile memory module, a memory management circuit only records the same single information for representing situations of bad physical programming units in all the physical erasing units. The memory management circuit also determines good physical erasing units of the rewritable non-volatile memory module according to the recorded single information. However, address offset values of different physical programming units in each physical erasing unit may be different. As a result, correct information with respect to the bad physical programming units in each physical erasing unit cannot actually be obtained if only the single information is employed for representing the situations of the bad physical programming units in each physical erasing unit. Moreover, the memory management performed through recording only the single information means that even in actual use, the address offset values corresponding to the bad physical programming units in each good physical erasing unit have to be the same. In this way, some available physical erasing units may be determined as bad physical erasing units and become unusable, which results in only less available capacity of the rewritable non-volatile memory module being determined. Meanwhile, in a system that at least two good physical erasing units are configured as a super physical unit, the address offset value corresponding to the bad physical programming units in each good physical erasing unit have to be the same, which leads to reduction in the number of the super physical units. Accordingly, how to reliably record correct information with respect to the bad physical programming units in each physical erasing unit so as to determine more capacity available for use is an important issue concerned by technicians of the field.

SUMMARY

The present invention is directed to a memory management method, a memory control circuit unit and a memory storage device capable of reliably identifying unavailable physical programming units in each physical erasing unit through recording use information for each physical erasing unit in a rewritable non-volatile memory module, so as to determine more available capacity.

According to an exemplary embodiment of the present invention, a memory management method for a rewritable non-volatile memory module is provided. The rewritable non-volatile memory module includes a plurality of physical erasing units, and each of the physical erasing units includes a plurality of physical programming units. The memory management method includes recording use information for each of the physical erasing units. The memory management method also includes configuring a plurality of super physical units, and each of the super physical units includes at least two of the physical erasing units. And, each of the super physical units includes a first super physical unit, and the first super physical unit includes a first physical erasing unit and a second physical erasing unit. The first physical erasing unit includes a first unavailable physical programming unit, the second physical erasing unit includes a first available physical programming unit, and an address offset value corresponding to the first unavailable physical programming unit of the first physical erasing unit is the same as an address offset value corresponding to the first available physical programming unit of the second physical erasing unit.

According to an exemplary embodiment of the present invention, a memory control circuit unit for controlling a rewritable non-volatile memory module is provided. The rewritable non-volatile memory module includes a plurality of physical erasing units, and each of the physical erasing units includes a plurality of physical programming units. The memory control circuit unit includes a host interface, a memory interface and a memory management circuit. The host interface is coupled to a host system. The memory interface is coupled to the rewritable non-volatile memory module. The memory management circuit is coupled to the host interface and the memory interface. The memory management circuit is configured to record use information for each of the physical erasing units. In addition, the memory management circuit is further configured to configure a plurality of super physical units according to the use information, and each of the super physical units includes at least two of the physical erasing units. And, each of the super physical units includes a first super physical unit, and the first super physical unit includes a first physical erasing unit and a second physical erasing unit. The first physical erasing unit includes a first unavailable physical programming unit, the second physical erasing unit includes a first available physical programming unit, and an address offset value corresponding to the first unavailable physical programming unit of the first physical erasing unit is the same as an address offset value corresponding to the first available physical programming unit of the second physical erasing unit.

According to an exemplary embodiment of the present invention, a memory storage device including a connection interface unit, a rewritable non-volatile memory module and the memory control circuit unit is provided. The connection interface unit is coupled to a host system. The memory control circuit unit is coupled to the connection interface unit and the rewritable non-volatile memory module.

To sum up, the unavailable physical programming units in each physical erasing unit can be accurately identified through recording the use information for each physical erasing unit in the rewritable non-volatile memory module.

Meanwhile, at least two physical erasing units having the unavailable physical programming units corresponding to different address offset values can be configured as a super physical unit according to the recorded use information. In this way, more available capacity can be determined, and the memory management can be more flexible.

To make the above features and advantages of the present invention more comprehensible, embodiments accompanied with drawings are described in detail below.

DESCRIPTION OF EMBODIMENTS

Generally speaking, a memory storage device (i.e., a memory storage system) includes a rewritable non-volatile memory module and a controller (i.e., a control circuit unit). The memory storage device is usually used together with a host system, such that the host system can write data into or read data from the memory storage device.

Figure 1:
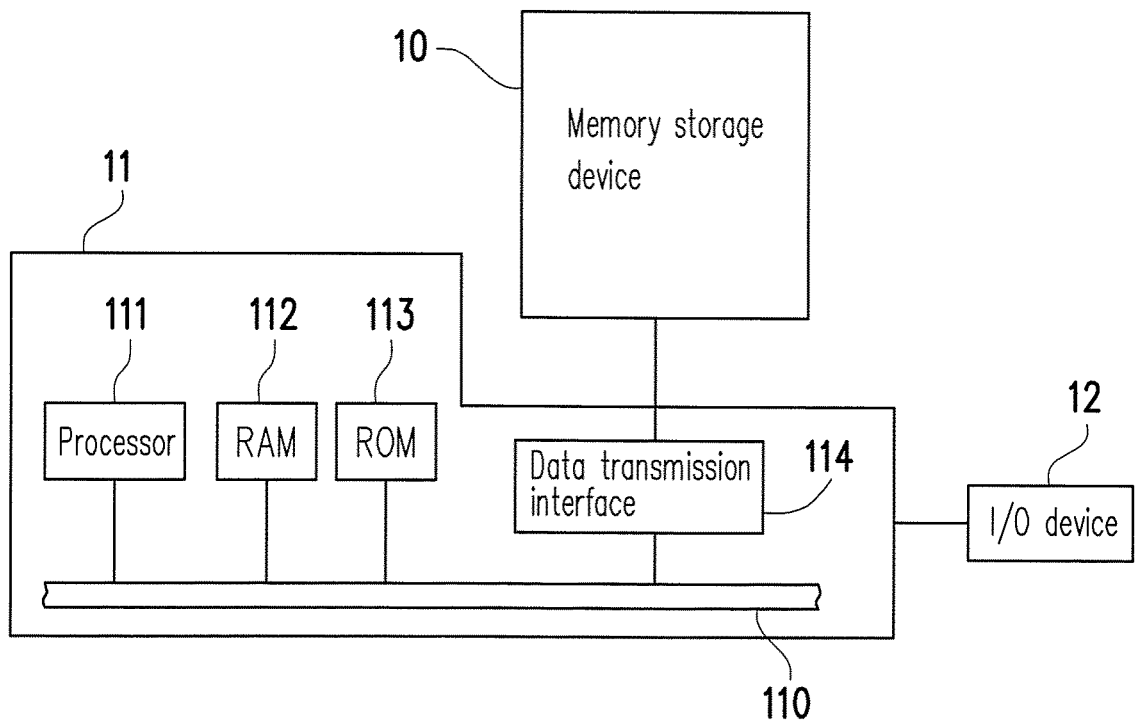
FIG. 1 is a schematic diagram of a host system, a memory storage device and an input/output (I/O) device according to an exemplary embodiment.
Figure 2:
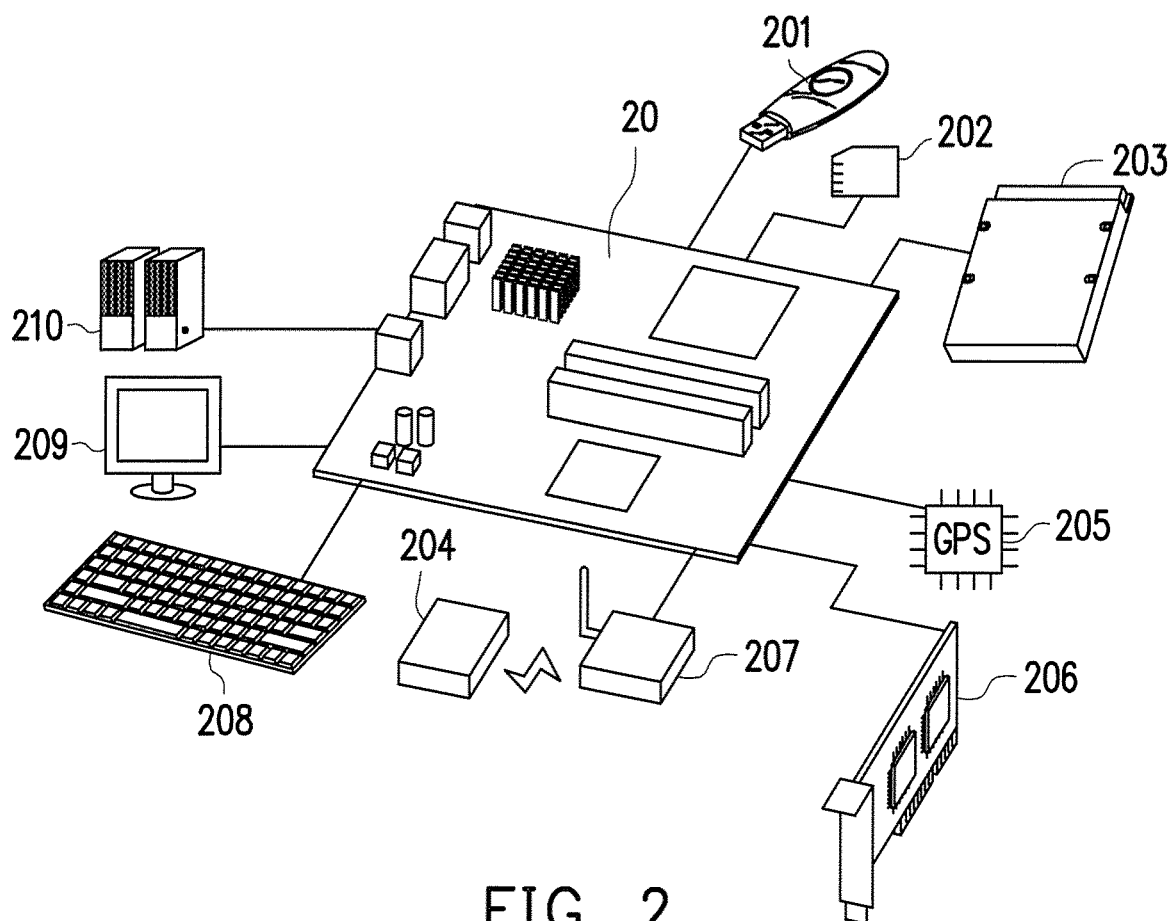
FIG. 2 is a schematic diagram of a host system, a memory storage device and an I/O device according to another exemplary embodiment.

FIG. 1 is a schematic diagram of a host system, a memory storage device and an input/output (I/O) device according to an exemplary embodiment, and FIG. 2 is a schematic diagram of a host system, a memory storage device and an I/O device according to another exemplary embodiment of the present invention.

Referring to FIG. 1 and FIG. 2, a host 11 generally includes a processor 111, a random access memory (RAM) 112, a read only memory (ROM) 113 and a data transmission interface 114. The processor 111, the RAM 112, the ROM 113 and the data transmission interface 114 are all coupled to a system bus 110.

In the present exemplary embodiment, the host system 11 is coupled to the memory storage device 10 through the data transmission interface 114. For instance, the host system 11 may write data into or read data from the memory storage device 10 through the data transmission interface 114. Additionally, the host system 11 is coupled to the I/O device 12 through the system bus 110. For example, the host system 11 may transmit an output signal to or receive an input signal from the I/O device 12 through the system bus 110.

In the present exemplary embodiment, the processor 111, the RAM 112, the ROM 113 and the data transmission interface 114 may be disposed on a mainboard 20 of the host system 11. The number of the data transmission interface 114 may be one or a plurality. The mainboard 20 may be coupled to the memory storage device 10 in a wired or a wireless manner through the data transmission interface 114. The memory storage device 10 may be a flash drive 201, a memory card 202, or a solid state drive (SSD) 203 or a wireless memory storage device 204. The wireless memory storage device 204 may be, for example, a memory storage device based on a variety of wireless communication techniques, such as a near field communication (NFC) memory storage device, a WiFi memory storage device, a Bluetooth memory storage device or a low energy (LE) Bluetooth memory storage device (e.g., an iBeacon device). Additionally, the mainboard 20 may also be coupled to various I/O devices, such as a global positioning system (GPS) module 205, a network interface card 206, a wireless transmission device 207, a keyboard 208, a monitor 209, and a speaker 210, through the system bus 110. For instance, in an exemplary embodiment, the mainboard 20 may access the wireless memory storage device 204 through the wireless transmission device 207.

Figure 3:
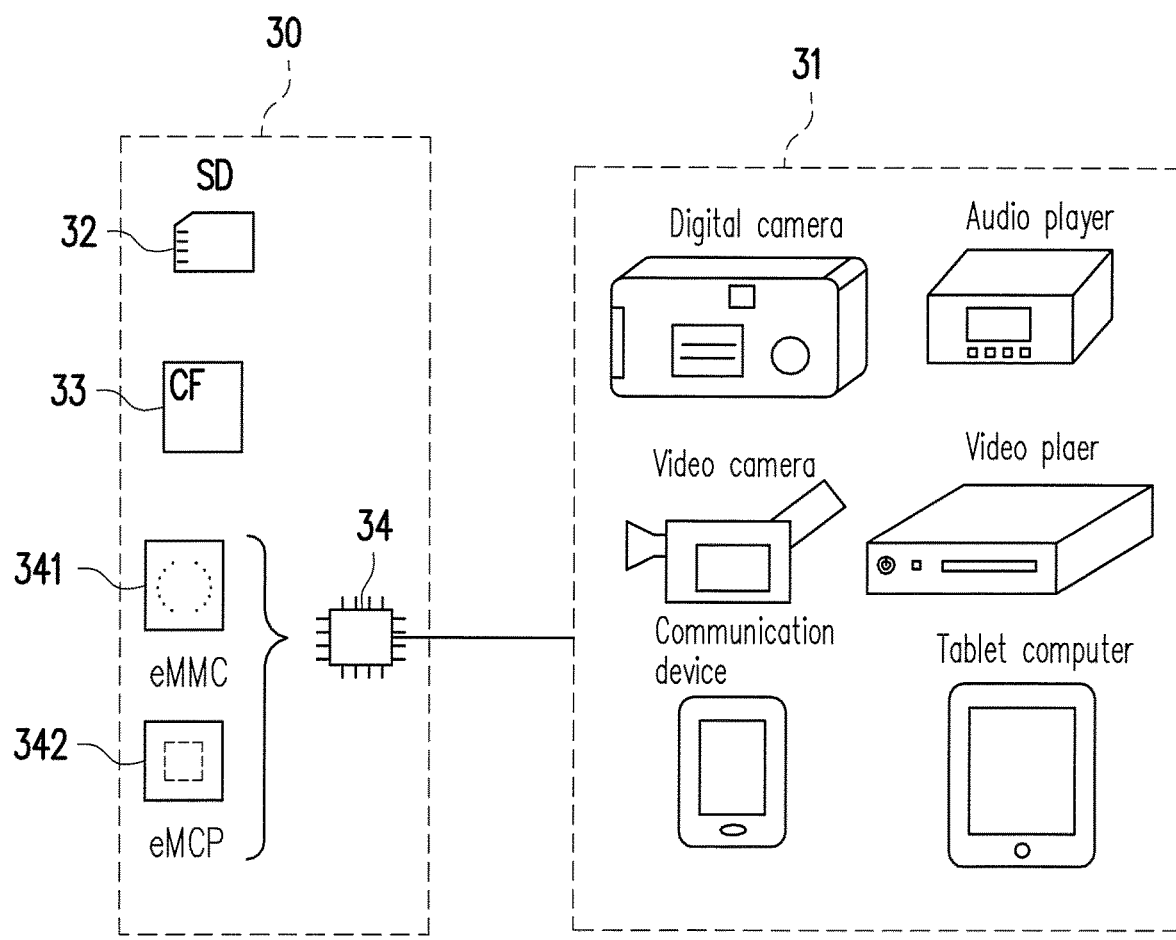
FIG. 3 is a schematic diagram of a host system and a memory storage device according to another exemplary embodiment.

In an exemplary embodiment, the aforementioned host system may substantially be any system collocated with the memory storage device for storing data. In the exemplary embodiments above, the host system is illustrated as a computer system for description; however, FIG. 3 is a schematic diagram of a host system and a memory storage device according to another exemplary embodiment. Referring to FIG. 3, in another exemplary embodiment, a host system 31 may also be a system, such as a digital camera, a video camera, a communication device, an audio player, a video player or a tablet computer, and a memory storage device 30 may be a non-volatile memory storage device used thereby, such as an SD card 32, a CF card 33 or an embedded storage device 34. The embedded storage device 34 may include an embedded MMC (eMMC) 341 and/or an embedded multi chip package (eMCP) 342, of which a memory module is directly coupled to a substrate of the host system.

Figure 4:
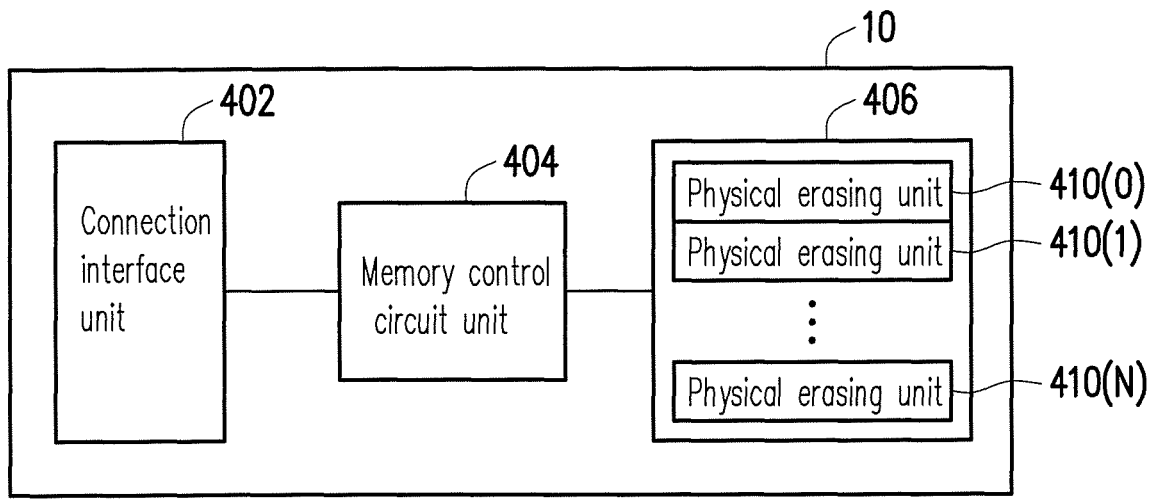
FIG. 4 is a schematic block diagram of a host system and a memory storage device according to an exemplary embodiment.

FIG. 4 is a schematic block diagram of a host system and a memory storage device according to an exemplary embodiment.

Referring to FIG. 4, the memory storage device 10 includes a connection interface unit 402, a memory control circuit unit 404, and a rewritable non-volatile memory module 406.

In the present exemplary embodiment, the connection interface unit 402 complies with a serial advanced technology attachment (SATA) standard. However, it should be understood that the present invention is not limited thereto, and the connection interface unit 402 may also comply with a parallel advanced technology attachment (PATA) standard, an institute of electrical and electronic engineers (IEEE) 1394 standard, a peripheral component interconnect express (PCI Express) standard, a universal serial bus (USB) standard, an ultra high speed-I (UHS-I) interface standard, an ultra high speed-II (UHS-II) interface standard, a secure digital (SD) interface standard, a memory stick (MS) interface standard, a multi-chip package interface standard, a multi media card (MMC) interface standard, an embedded multimedia card (eMMC) interface standard, a universal flash storage (UFS) interface standard, an embedded multi-chip package (eMCP) interface standard, a compact flash (CF) interface standard, an integrated device electronics (IDE) standard, or other suitable standards. In the present exemplary embodiment, the connection interface unit 402 may be packaged with the memory control circuit unit 404 in one chip or laid outside a chip including the memory control circuit unit.

The memory control circuit unit 404 is configured to execute a plurality of logic gates or control instructions which are implemented in a hardware form or in a firmware form and perform operations such as data writing, data reading or data erasing in the rewritable non-volatile memory module 406 according to the commands of the host system 11.

The rewritable non-volatile memory module 406 is coupled to the memory control circuit unit 404 and configured to store data written by the host system 11. The rewritable non-volatile memory module 406 includes a plurality of physical erasing units 410(0)-410(N). For instance, the physical erasing units 410(0)-410(N) may belong to the same memory die or different memory dies. Each of the physical erasing units includes a plurality of physical programming units, and the physical programming units belonging to the same physical erasing unit may be written separately but erased altogether at the same time. However, it should be understood that the present invention is not limited thereto, and each of the physical erasing units may be composed of 64, 256 or any other number of physical programming units.

In detail, a physical erasing unit is the smallest unit for erasing. Namely, each physical erasing unit has the least number of memory cells to be erased altogether. A physical programming unit is the smallest unit for programming. Namely, the physical programming units are the smallest units for writing data. Each of the physical programming units generally includes a data bit area and a redundant bit area. The data bit area includes a plurality of physical access addresses for storing user data, and the redundant bit area is configured for storing system data (e.g., control information and error correcting codes). In the present exemplary embodiment, the data bit area of each physical programming unit contains 8 physical access addresses, and the size of each physical access address is 512 bytes. However, in other exemplary embodiments, the data bit area may contain more or less physical access addresses, and the number and the size of the physical access addresses are not limited in the present invention. For instance, in an exemplary embodiment, the physical erasing units are physical blocks, and the physical programming units are physical pages or physical sectors, which are not limited in the present invention.

In the present exemplary embodiment, each of the physical erasing units 410(0)-410(N) belongs to one of a plurality of operation units. The physical erasing units belonging to different operation units may be simultaneously and alternately programmed. For example, an operation unit may be a channel, a chip, a die or a plane. To be specific, in an exemplary embodiment, the memory storage device 10 has a plurality of channels, and the memory control circuit unit 404 accesses different parts of the physical erasing units 410(0)-410(N) through different channels. The physical erasing units in different channels are operated independently. For example, when the memory control circuit unit 404 performs a writing operation on the physical erasing units in a channel, the memory control circuit unit 404 may simultaneously perform a reading operation or another operation on the physical erasing units in another channel. In the memory storage device 10, the physical erasing units in the same channel may belong to different chips. In an exemplary embodiment, the physical erasing units belonging to different chips also belong to different interleaves. After programming the physical erasing units in a certain chip, the memory control circuit unit 404 does not have to wait for a ready signal replied by the chip and directly continue to program the physical erasing units in the next chip. In the rewritable non-volatile memory module 406, the physical erasing units in the same interleaf may also belong to different planes. The physical erasing units belonging to different planes in the same interleaf may be simultaneously programmed according to the same write command.

In an exemplary embodiment, a channel and a chip are configured in the memory storage device 10, and the chip includes two planes, but the present invention is not limited thereto. In another exemplary embodiment, the memory storage device 10 may also include n channels, m interleaves and k planes, where n, m and k are positive integers, and one of the positive integers is greater than 1 (i.e., the memory storage device 10 includes a plurality of operational units). However, the values of the positive integers n, m and k are not limited in the present invention.

In the present exemplary embodiment, the rewritable non-volatile memory module 406 is a multi level cell (MLC) NAND flash memory module (i.e., a flash memory module capable of storing data of 2 bits in one memory cell). However, the present invention is not limited thereto, and the rewritable non-volatile memory module 406 may also be a single-level cell (SLC) NAND flash memory module (i.e., a flash memory module capable of storing data of 1 bit in one memory cell), a trinary-level cell (TLC) NAND flash memory module (i.e., a flash memory module capable of storing data of 3 bits in one memory cell), any other flash memory module, or any other memory module with the same characteristics.

Figure 5:
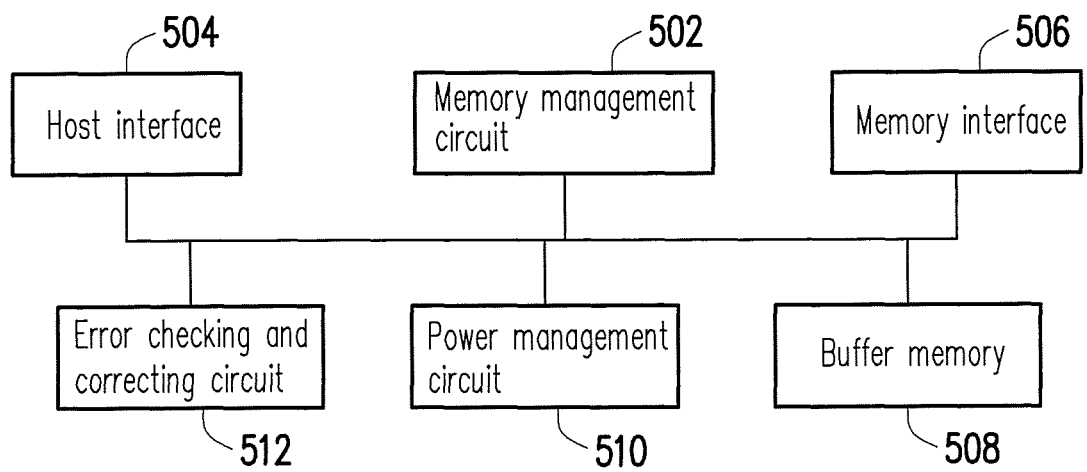
FIG. 5 is a schematic block diagram of the memory control circuit unit according to an exemplary embodiment.

FIG. 5 is a schematic block diagram of the memory control circuit unit according to an exemplary embodiment.

Referring to FIG. 5, the memory controller 404 includes a memory management circuit 502, a host interface 504, a memory interface 506, a buffer memory 508, a power management circuit 510, and an error checking and correcting circuit 512.

The memory management circuit 502 is configured to control the overall operation of the memory control circuit unit 404. Specifically, the memory management circuit 502 has a plurality of control instructions, and when the memory storage device 10 is in operation, the control instructions are executed to perform various data operations, such as data writing, data reading and data erasing.

In the present exemplary embodiment, the control instructions of the memory management circuit 502 are implemented in a firmware form. For instance, the memory management circuit 502 has a microprocessor unit (not shown) and a read-only memory (ROM, not shown), and the control instructions are burnt into the ROM. When the memory storage device 10 is in operation, the control instructions are executed by the microprocessor unit to perform data operations, such as data writing, data reading and data erasing.

In another exemplary embodiment, the control instructions of the memory management circuit 502 may also be stored in a specific area (e.g., a system area in the memory module exclusively used for storing system data) of the rewritable non-volatile memory module 406 as program codes. Moreover, the memory management circuit 502 has a microprocessor unit (not shown), a read-only memory (ROM, not shown), and a random access memory (RAM, not shown). Specifically, the read-only memory has a boot code. When the memory controller 404 is enabled, the microprocessor unit first executes the boot code for loading the control instructions stored in the rewritable non-volatile memory module 406 into the random access memory of the memory management circuit 502. Afterwards, the microprocessor unit executes the control instructions for data operations, such as data writing, data reading and data erasing.

Additionally, in another exemplary embodiment, the control instructions of the memory management circuit 502 may also be implemented in a hardware form. For example, the memory management circuit 502 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory management unit is configured for managing the physical erasing units of the rewritable non-volatile memory module 406; the memory writing circuit is configured to issue a writing command to the rewritable non-volatile memory module 406 for writing data to the rewritable non-volatile memory module 406; the memory reading circuit is configured for issuing a reading command to the rewritable non-volatile memory module 406 to read data from the rewritable non-volatile memory module 406; the memory erasing circuit is configured for issuing an erasing command to the rewritable non-volatile memory module 406 to erase data from the rewritable non-volatile memory module 406; and the data processing circuit is configured for processing data to be written to the rewritable non-volatile memory module 406 or data read from the rewritable non-volatile memory module 406.

The host interface 504 is coupled to the memory management circuit 502 and configured for receiving and identifying commands and data transmitted from the host system 11. Namely, the commands and the data sent by the host system 11 are transmitted to the memory management circuit 502 through the host interface 504. In the present exemplary embodiment, the host interface 504 complies with the SATA standard. However, it should be understood that the present invention is not limited thereto, and the host interface 504 may also comply with the PATA standard, the IEEE 1394 standard, the PCI Express standard, the USB standard, the UHS-I standard, the UHS-II standard, the SD standard, the MS standard, the MMC standard, the CF standard, the IDE standard, or other suitable standards for data transmission.

The memory interface 506 is coupled to the memory management circuit 502 and configured for accessing to the rewritable non-volatile memory module 406. In other words, the data to be written into the rewritable non-volatile memory module 406 is converted to a format acceptable for the rewritable non-volatile memory module 406 by the memory interface 506.

The buffer memory 508 is coupled to the memory management circuit 502 and configured for temporarily storing data and commands from the host system 11 or data from the rewritable non-volatile memory module 406.

The power management circuit 510 is coupled to the memory management circuit 502 and configured for controlling the power of the memory storage device 10.

The error checking and correcting circuit 512 is coupled to the memory management circuit 502 and configured for performing an error checking and correcting procedure to ensure the accuracy of data. To be specific, when the memory management circuit 502 receives a write command from the host system 11, the error checking and correcting circuit 512 generates an error checking and correction (ECC) code for the data corresponding to the write command, and the memory management circuit 502 writes the data and the ECC code corresponding to the writing command into the rewritable non-volatile memory module 406. Subsequently, when the memory management circuit 502 reads the data from the rewritable non-volatile memory module 406, the memory management circuit 502 simultaneously reads the ECC code corresponding to the data, and the error checking and correcting circuit 512 performs the error checking and correcting procedure on the read data according to the ECC code.

Figure 6:
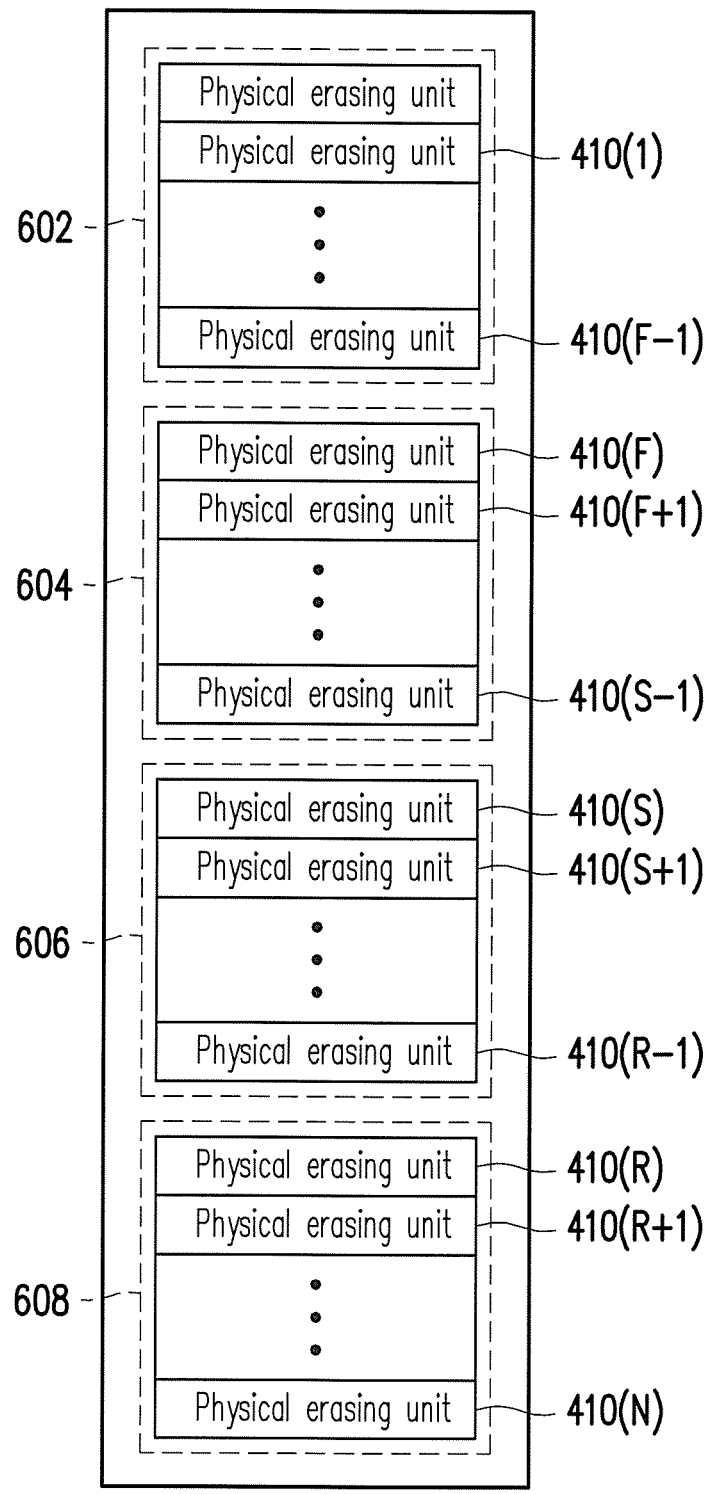
FIG. 6 and FIG. 7 are exemplary schematic diagrams illustrating the management of the physical erasing units according to an exemplary embodiment.
Figure 7:
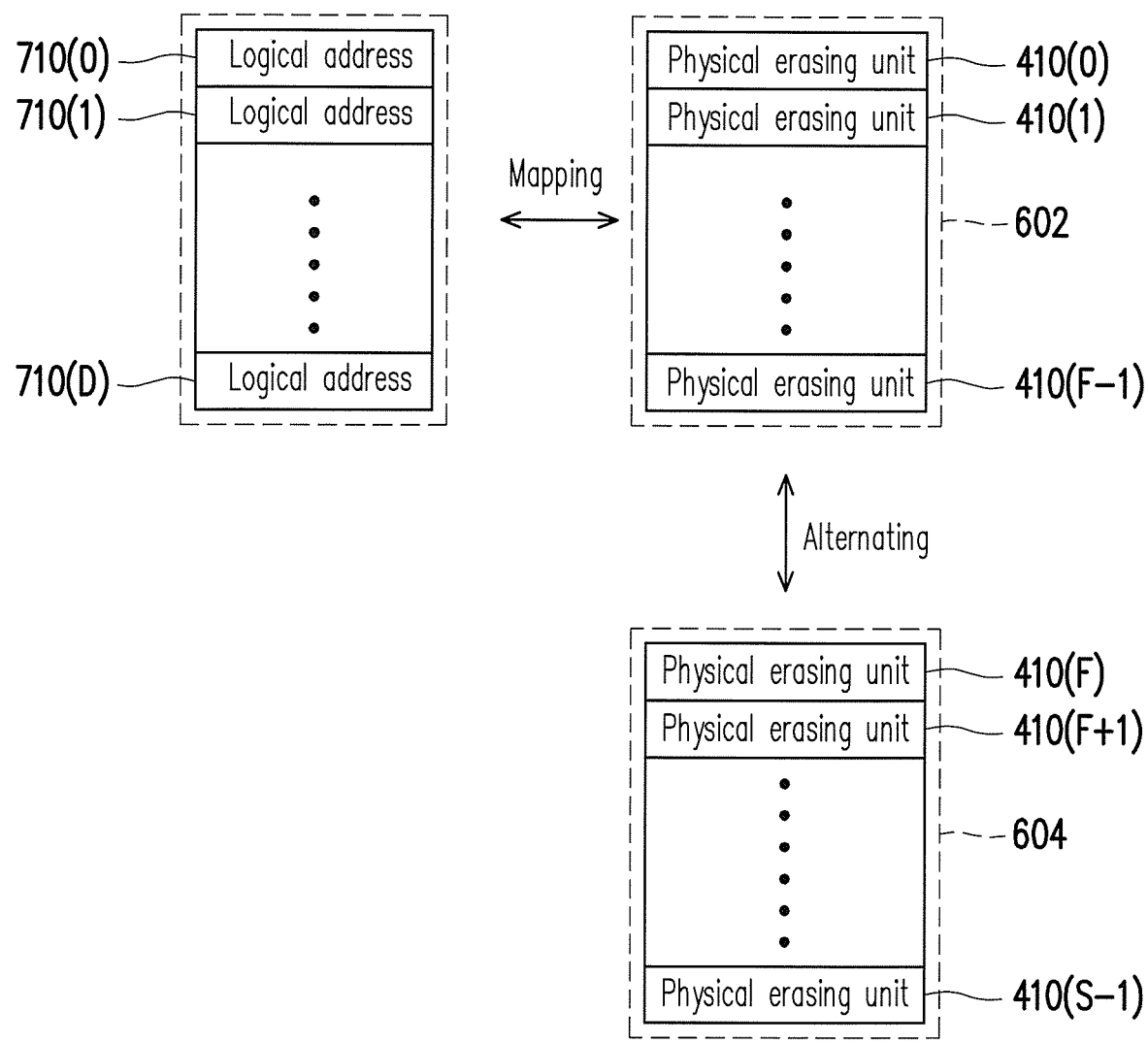

FIG. 6 and FIG. 7 are exemplary schematic diagrams illustrating the management of the physical erasing units according to an exemplary embodiment.

It should be understood that terms, such as "select", "group", "divide", "associate" and so forth, are logical concepts which describe operations in the physical erasing units of the rewritable non-volatile memory module 406. That is, the physical erasing units of the rewritable non-volatile memory module are logically operated, but actual positions of the physical erasing units of the rewritable non-volatile memory module are not changed.

Referring to FIG. 6, the memory control circuit unite (or the memory management circuit 502) may logically group the physical erasing units 410(0)-410(N) into a data area 602, a spare area 604, a system area 606, and a replacement area 608.

The physical erasing units logically belonging to the data area 602 and the spare area 604 are configured to store data from the host system 11. To be specific, the physical erasing units of the data area 602 are considered as the physical erasing units which have been used for storing data, and the physical erasing units of the spare area 604 are used for replacing the physical erasing units of the data area 602. Namely, when the host system 11 receives a write command and data to be written, the memory management circuit 502 selects a physical erasing unit from the spare area 604 and writes the data into the selected physical erasing unit in replacement with a physical erasing unit of the data area 602.

The physical erasing units logically belonging to the data area 606 are used for recording system data. For instance, the system data includes the manufacturers and models of the rewritable non-volatile memory module, the number of physical erasing units in the rewritable non-volatile memory module, the number of physical programming units in each physical erasing unit, and so on.

The physical erasing units logically belonging to the replacement area 608 are used in a bad physical erasing unit replacement procedure for replacing damaged physical erasing units. Specifically, if there are still normal physical erasing units in the replacement area, and a physical erasing unit in the data area 602 is damaged, the memory management circuit 502 selects a normal physical erasing unit from the replacement area 608 to replace the damaged physical unit.

In particular, the numbers of the physical erasing units in the data area 602, the spare area 604, the system area 606 and the replacement area 608 vary with different memory module standards. Additionally, it should be understood that the grouping relations of associating the physical erasing units with the data area 602, the spare area 604, the system area 606 and the replacement area 608 are dynamically changed in the operations of the memory storage device 10. For example, when a physical erasing unit in the spare area 604 is damaged and replaced by a physical erasing unit in the replacement area 608, the physical erasing unit which is previously in the replacement area 608 is associated with the spare area 604.

With reference to FIG. 7, as described above, the physical erasing units of the data area 602 and the spare area 604 are alternately used for storing the data written by the host system 11. In the present exemplary embodiment, the memory control circuit unit 404 (or the memory management circuit 502) configures logical addresses 710(0)-710(D) to the host system 11 for mapping to the physical erasing units 410(0)-410(F-1) of the data area 502, so as to access data in the aforementioned physical erasing units which are alternately used for storing the data. Specifically, the host system 11 accesses the data in the storage area 602 through the logical addresses 710(0)-710(D). In the present exemplary embodiment, a logical address is mapped to a physical sector, a plurality of logical addresses form a logical programming unit, and a plurality of logical programming units form a logical erasing unit.

Moreover, the memory control circuit unit 404 (or the memory management circuit 502) establishes a logical-physical mapping table for recording the mapping relationship between the logical addresses and the physical erasing units. In the present exemplary embodiment, the memory control circuit unit 404 (or the memory management circuit 502) manages the rewritable non-volatile memory module 406 by means of the logical programming units. Thus, the memory control circuit unit 404 (or the memory management circuit 502) establishes a logical-physical mapping table for recording the mapping relationship between the logical programming units and the physical programming units. In another exemplary embodiment, the memory control circuit unit 404 (or the memory management circuit 502) manages the rewritable non-volatile memory module 406 by means of the logical erasing units. Thus, the memory control circuit unit 404 (or the memory management circuit 502) establishes a logical-physical mapping table for recording the mapping relationship between the logical erasing units and the physical erasing units.

Each physical erasing unit of the rewritable non-volatile memory module 406 may include at least one unavailable physical programming unit, e.g., at least one bad physical programming unit. The memory control circuit unit 404 (or the memory management circuit 502) records corresponding use information for each physical erasing unit in the rewritable non-volatile memory module 406. In the present exemplary embodiment, the memory control circuit unit 404 (or the memory management circuit 502) records bad physical programming units of each physical erasing unit in the use information of the physical erasing unit. However, in another exemplary embodiment, the memory control circuit unit 404 (or the memory management circuit 502) may also record available physical programming units, e.g., good physical programming units, of each physical erasing unit in the use information of each physical erasing unit. In this way, the memory control circuit unit 404 (or the memory management circuit 502) identifies the bad physical programming units and the good physical programming units in each physical erasing unit according to the use information of each physical erasing unit.

Specifically, the memory control circuit unit 404 (or the memory management circuit 502) scans the good physical programming units of each physical erasing unit and records the use information according to the scanning result. In addition, the memory control circuit unit 404 (or the memory management circuit 502) may also first scan at least one physical erasing unit and calculate the number of the good physical programming units of the physical erasing unit to determine whether to record the good physical programming units or the bad physical programming units in the use information.

In an exemplary embodiment, the memory control circuit unit 404 (or the memory management circuit 502) may select a physical erasing unit from all the physical erasing units, scan the good physical programming units of the physical erasing unit to calculate the number of the good physical programming units of the physical erasing unit. In addition, the memory control circuit unit 404 (or the memory management circuit 502) may determine whether the number of the good physical programming units of the physical erasing unit is greater than an identification threshold. The identification threshold may be set according to the total number of the physical programming units contained in a physical erasing unit. In the present exemplary embodiment, the identification threshold may be set to half the total number of the physical programming units contained in a physical erasing unit. Namely, if it is assumed that a physical erasing unit contains 256 physical programming units, the identification threshold may be set to 128 physical programming units. If the number of the good physical programming units in the selected physical erasing unit is greater than the identification threshold (for example, the number of the good physical programming units is greater than 128), it indicates that the number of the bad physical programming units in the physical erasing unit is less than the number of the good physical programming units. Accordingly, the memory control circuit unit 404 (or the memory management circuit 502) determines to record the bad physical programming units of the physical erasing unit in the use information. By contrast, if the number of the good physical programming units in the physical erasing unit is not greater than the identification threshold (for example, the number of the good physical programming units is less than or equal to 128), it indicates that the number of the bad physical programming units in the physical erasing unit is greater than the number of the good physical programming units. The memory control circuit unit 404 (or the memory management circuit 502) determines to record the good physical programming units of the physical erasing unit in the use information. The amount of information recorded in the use information may be reduced by determining whether to record the good physical programming units or the bad physical programming units in advance.

It should be mentioned that in another exemplary embodiment, the memory control circuit unit 404 (or the memory management circuit 502) may also select multiple physical erasing units from all the physical erasing units, scan the good physical programming units of the physical erasing units to calculate the number of the good physical programming units of the physical erasing units. For instance, the memory control circuit unit 404 (or the memory management circuit 502) may calculate the number of the good physical programming units in each selected physical erasing unit and calculate an average value of the numbers for representing the number of the good physical programming units of the physical erasing units. In another exemplary embodiment, the memory control circuit unit 404 (or the memory management circuit 502) may also calculate the number of the good physical programming units in each selected physical erasing unit and calculate a sum of the numbers for representing the number of the good physical programming units of the physical erasing units.

If the average value is greater than the identification threshold, the memory control circuit unit 404 (or the memory management circuit 502) may determine to record the bad physical programming units of the physical erasing units in the use information; otherwise, determine to record the good physical programming units. In the present exemplary embodiment, the identification threshold is set to half of the total number of the physical programming units contained in a physical erasing unit multiplied by the number of the selected physical erasing units. If the sum is greater than the identification threshold, the memory control circuit unit 404 (or the memory management circuit 502) may determine to record the bad physical programming units of each physical erasing unit in the use information; otherwise, determine to record the good physical programming units. In another exemplary embodiment, the memory control circuit unit 404 (or the memory management circuit 502) may also scan the number of the good physical programming units in all the physical erasing units and compare the average value or the sum of the numbers with the identification threshold to determine whether to record the bad physical programming units or the good physical programming units.

On the other hand, in order to identify whether the physical programming units recorded in the use information are the good physical programming units or the bad physical programming units, the memory control circuit unit 404 (or the memory management circuit 502) may further record an identification flag for the use information. The memory control circuit unit 404 (or the memory management circuit 502) may record only one identification flag and serve is as a mark of all use information. Moreover, the identification flag may be represented by a bit. For example, if the identification flag is recorded as 1, it represents that all the physical programming units recorded in the use information are the good physical programming units. If the identification flag is recorded as 0, it represents that all the physical programming units recorded in the use information are the bad physical programming units. However, the identification flag may also be represented by multiple bits, which is not limited in the present invention.

Figure 8:
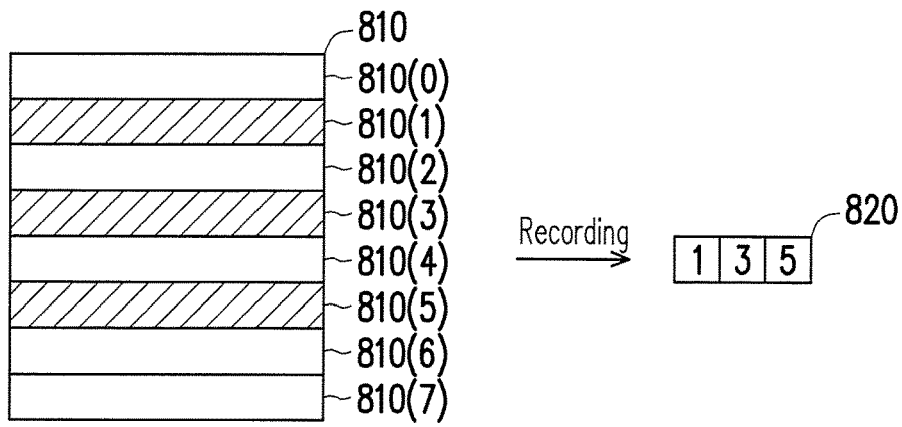
FIG. 8 is a schematic diagram illustrating the recordation of bad physical programming units in use information according to an exemplary embodiment.

FIG. 8 is a schematic diagram illustrating the recordation of bad physical programming units in use information according to an exemplary embodiment.

With reference to FIG. 8, a physical erasing unit 810 contains 8 physical programming units (i.e., $0^{th}$~$7^{th}$ physical programming units). After scanning the physical programming unit 810, the memory control circuit unit 404 (or the memory management circuit 502) determines that the $1^{st}$ physical programming unit (i.e., the physical programming unit 810(1)), the $3^{rd}$ physical programming unit (i.e., the physical programming unit 810 (3)) and the $5^{th}$ physical programming unit (i.e., the physical programming unit 810 (5)) are the bad physical programming units. Thus, the memory control circuit unit 404 (or the memory management circuit 502) records use information 820 for the physical erasing unit 810 and records values 1, 3 and 5 in the use information for indicating that the physical programming units 810(1), 810(3) and 810(5) are the bad physical programming units.

In the present exemplary embodiment, the values 1, 3 and 5 recorded in the use information 820 are only illustrative for example. In another exemplary embodiment, the memory control circuit unit 404 (or the memory management circuit 502) may records address offset values corresponding to the bad physical programming units of the physical erasing unit 810 in the use information 820. In this case, an address offset value corresponding to a physical programming unit refers to a distance of a start address of the physical programming unit relative to a start address of a physical erasing unit that the physical programming unit belongs to. Moreover, the memory control circuit unit 404 (or the memory management circuit 502) may record the bad physical programming units in a form of bytes. Namely, in a case where a physical erasing unit contains 256 physical programming units (i.e., $0^{th}$~$255^{th}$ physical programming units), a physical programming unit is represented by one byte. For example, a byte "00000000" represents that the $0^{th}$ physical programming unit is a bad physical programming unit. In this case, if a physical erasing unit contains 8 bad physical programming units, the memory control circuit unit 404 (or the memory management circuit 502) records 8 bytes in the use information for representing the 8 bad physical programming units. However, the bad physical programming unit may be recorded in a form of bits. For example, in a scenario that a physical erasing unit contains 256 physical programming units (i.e., $0^{th}$~$255^{th}$ physical programming units), each bit is used to represent a physical programming unit. It is assumed that a bit value of 1 represents a bad physical programming unit, and a bit value of 0 represents a good physical programming unit. If the $5^{th}$ bit in the use information of a certain physical erasing unit is 1, it indicates that the $5^{th}$ physical programming unit of the physical erasing unit is a bad physical programming unit. In this circumstance, no matter how many bad physical programming units are contained in a physical erasing unit, the memory control circuit unit 404 (or the memory management circuit 502) may record 256 bits (i.e., 32 bytes) in the use information for representing the bad physical programming units. Therefore, in what form to record the physical programming units may be determined based on actual requirements, and is not limited in the present invention.

After determining whether to record the bad physical programming units or the good physical programming units in the use information, the memory control circuit unit 404 (or the memory management circuit 502) scans all the physical erasing units and records the corresponding use information for each physical erasing unit. The use information may be recorded in a physical erasing unit of the rewritable non-volatile memory module, e.g., a physical erasing unit in the system area.

The memory control circuit unit 404 (or the memory management circuit 502) may also configure super physical units according to the recorded use information. A super physical unit includes at least two good physical erasing units among all the physical erasing units. In addition, an address offset value corresponding to a bad physical programming unit of one of the good physical erasing units may be different from an address offset value corresponding to a bad physical programming unit of the other physical erasing unit. In other words, good physical programming units in the two good physical erasing units of the super physical unit may be located at positions in the two physical erasing units that are not corresponding to each other. Each super physical unit may include a plurality of super physical programming units. Namely, the good physical programming units located at non-corresponding addresses in the two physical erasing units may be configured as a super physical programming unit in the super physical unit. For example, a $1^{st}$, a $3^{rd}$, a $5^{th}$ and a $7^{th}$ physical programming units in one of the good physical erasing units of the super physical unit are good, while a $0^{th}$, a $2^{nd}$, a $4^{th}$ and a $6^{th}$ physical programming units in the other good physical erasing unit are good, and thus, the $1^{st}$ physical programming unit of the one of the good physical erasing units and the $0^{th}$ physical programming unit of the other good physical erasing unit may be configured as one super physical programming unit. In the present exemplary embodiment, the at least two good physical erasing units included in the super physical unit belong to different operational units (e.g., different planes, different interleaves or different channels). Thus, different physical programming units in one super physical programming unit may be simultaneously programmed according to the same write command.

Specifically, the memory control circuit unit 404 (or the memory management circuit 502) calculates an available capacity of the rewritable non-volatile memory module 406 according to the use information of all the physical erasing units. To be more detailed, the available capacity is calculated according to the number of the good physical programming units in each physical erasing unit. For example, the memory control circuit unit 404 (or the memory management circuit 502) may calculate the number of the good physical programming units in each physical erasing unit according to the use information of each physical erasing unit. The memory control circuit unit 404 (or the memory management circuit 502) may also determine a capacity of each super physical unit according to the calculated numbers. In the present exemplary embodiment, the memory control circuit unit 404 (or the memory management circuit 502) identifies the minimum value among the calculated numbers and serves it as the capacity for configuring each good physical erasing unit of the super physical unit, so as to determine the capacity of each super physical unit. Namely, the capacity for configuring each good physical erasing unit of the super physical unit meets the minimum value among the numbers of the good physical programming units of all physical erasing units, and the capacity of a super physical unit meets the minimum value multiplied by the number of the good physical erasing units included in the super physical unit. In this way, the memory control circuit unit 404 (or the memory management circuit 502) may determine the available capacity according to the number of the configured super physical units and the capacity of each super physical unit. For example, the available capacity may be calculated by multiplying the capacity of each super physical unit by the number of the super physical units.

Figure 9:
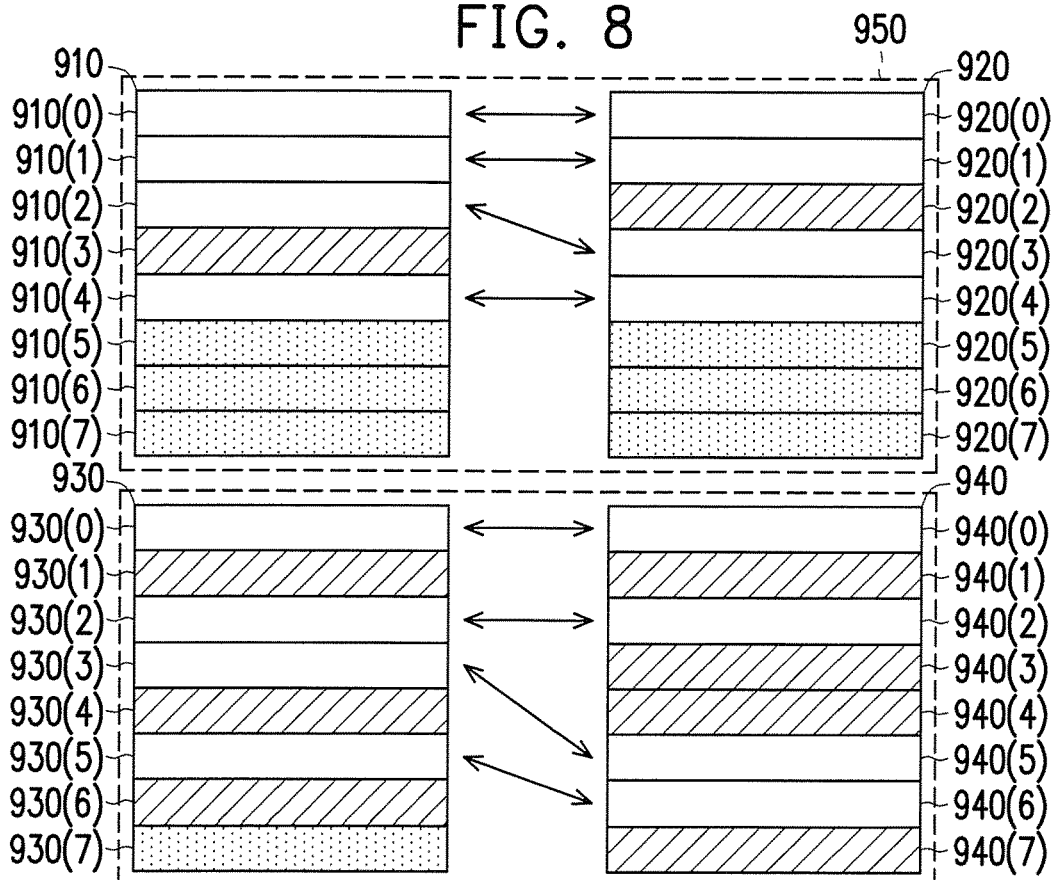
FIG. 9 is a schematic diagram illustrating the calculation of available capacity according to an exemplary embodiment.

FIG. 9 is a schematic diagram illustrating the calculation of the available capacity according to an exemplary embodiment.

With reference to FIG. 9, it is assumed that a rewritable non-volatile memory module 901 includes physical erasing units 910, 920, 930 and 940, and each physical erasing unit has 8 physical programming units. The memory control circuit unit 404 (or the memory management circuit 502) identifies that each of the physical erasing units 910 and 920 has a bad physical programming unit according to use information of each physical erasing unit. The physical erasing unit 930 contains 3 bad physical programming units, and the physical erasing unit 940 contains 4 bad physical programming units. In other words, the memory control circuit unit 404 (or the memory management circuit 502) calculates that the number of good physical programming units in the physical erasing unit 910 is 7, the number of good physical programming units in the physical erasing unit 920 is 7, the number of good physical programming units in the physical erasing unit 930 is 5, and the number of good physical programming units in the physical erasing unit 940 is 4. Namely, the physical erasing unit 940 has the smallest number of good physical programming units among all the physical erasing units. Thus, the memory control circuit unit 404 (or the memory management circuit 502) determines that the capacity of a good physical erasing unit may is 4 good physical programming units. In the present exemplary embodiment, each super physical unit includes two good physical erasing units, thereby, super physical units 950 and 960 are configured, and a capacity of each super physical unit includes 8 good physical programming units. Accordingly, the memory control circuit unit 404 (or the memory management circuit 502) calculates that the available capacity of the rewritable non-volatile memory module 91 is 16 good physical programming units.

Additionally, each physical erasing unit has its corresponding use information, and thus, the memory control circuit unit 404 (or the memory management circuit 502) determines address offset values corresponding to the bad physical programming units in each bad physical programming unit according to the use information. Namely, the memory control circuit unit 404 (or the memory management circuit 502) may configure the super physical units according to the physical erasing units including the bad physical programming units having different address offset values. Referring to FIG. 9, the super physical unit 950 includes the physical erasing units 910 and 920, a physical programming unit 910(3) in the physical erasing unit 910 is a bad physical programming unit, and a corresponding address offset value thereof is 3, while a physical programming unit 920(2) in the physical erasing unit 920 is a bad physical programming unit, and a corresponding address offset value thereof is 2. Namely, the physical erasing units 910 and 920 in the configured super physical unit may include good physical programming units (e.g., a physical programming unit 910(0) of the physical erasing unit 910 and a physical programming unit 920(0) of the physical erasing unit 920) corresponding to the same address offset value and may also include good physical programming units (e.g., a physical programming unit 910(2) of the physical erasing unit 910 and a physical programming unit 920(3) of the physical erasing unit 920) corresponding to different address offset values. And, an address offset value corresponding to the bad physical programming unit 910(3) in the physical erasing unit 910 is the same as an address offset value corresponding to the good physical programming unit 920(3) in the physical erasing unit 920. In other words, the physical programming unit 910(0) of the physical erasing unit 910 and the physical programming unit 920(0) of the physical erasing unit 920 may be configured as a super programming physical unit of the super physical unit 950, and the physical programming unit 910(2) of the physical erasing unit 910 and the physical programming unit 920(3) of the physical erasing unit 920 may be also configured as another super programming physical unit of the super physical unit 950.

Additionally, since the capacity of a good physical erasing unit is determined according to the minimum value among the numbers of the good physical programming units of the physical erasing units. Thus, the physical erasing units 910, 920, 930 and 940 include part of the good physical programming units belonging to the remaining good physical programming units. Write data is not programmed into the remaining good physical programming units when a writing operation is performed the physical erasing units.

In some rewritable non-volatile memory modules, the data stored in a physical programming unit may be affected due another physical programming unit. For example, in a rewritable non-volatile memory module in which a memory cell is capable of storing a plurality of bits, a plurality of physical programming units formed by the same memory cell may be mutually affected due to a programming operation. Thus, in the present exemplary embodiment, the memory control circuit unit 404 (or the memory management circuit 502) first performs a programming test on at least one physical erasing unit and determines whether to program dummy data to the bad physical programming units during the writing operation according to a result of the programming test.

To be specific, the memory control circuit unit 404 (or the memory management circuit 502) selects at least one physical erasing unit for the programming test. During the programming test, the memory control circuit unit 404 (or the memory management circuit 502) performs the programming operation on the selected physical erasing unit twice. Test data is programmed into a good physical programming unit during both the two programming operations, and in one of the programming operations, the dummy data is not programmed into the bad physical programming unit; however, in the other programming operation, the dummy data is programmed into the bad physical programming unit. Each time when the programming operation is performed, the memory control circuit unit 404 (or the memory management circuit 502) reads the data stored in the selected physical erasing unit and calculates the number of error bits in the read data to determine whether to program the dummy data into the bad physical programming unit according to the number of the error bits calculated after the two programming operations are performed.

Figure 10:
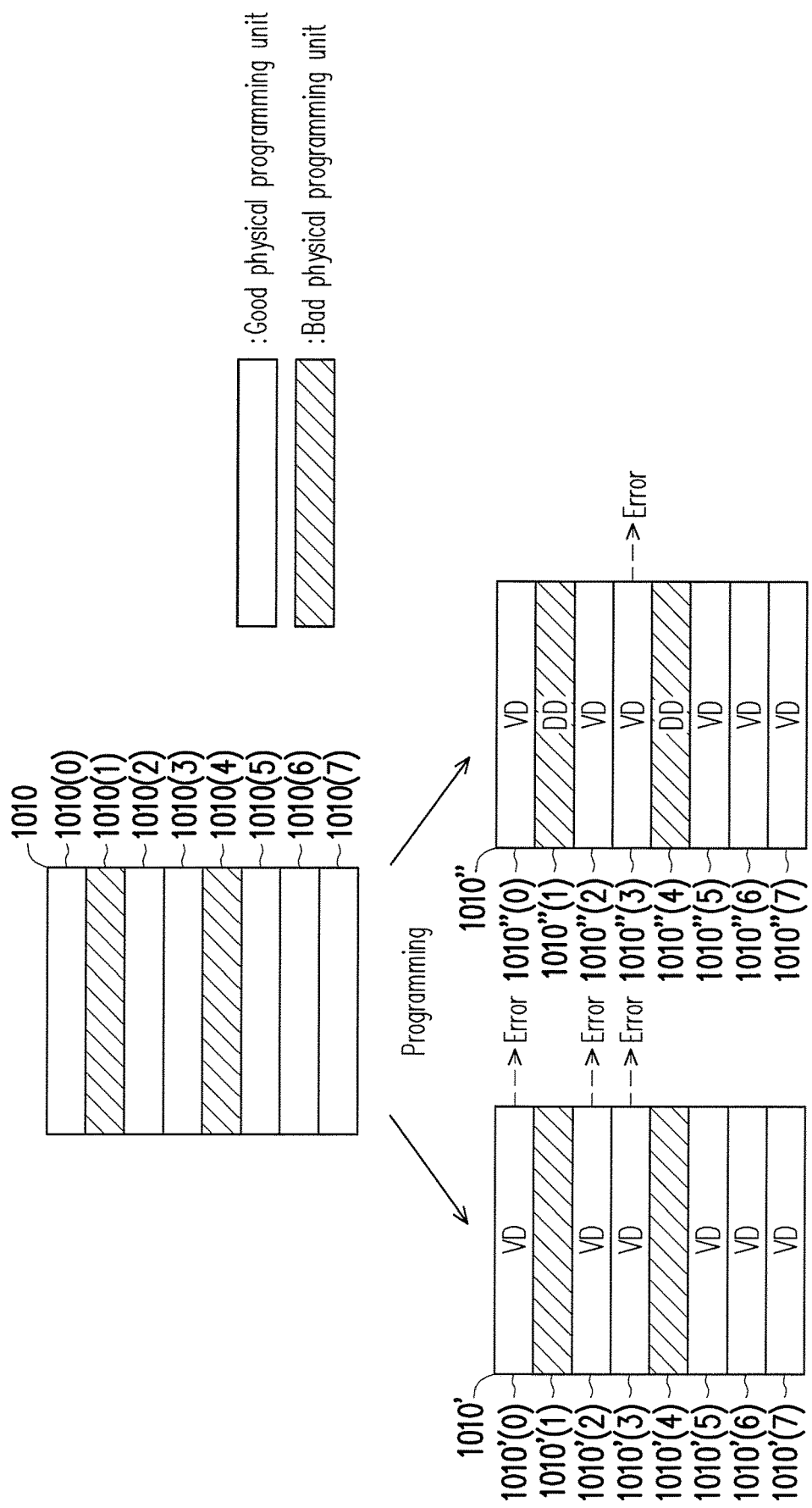
FIG. 10 is a schematic diagram illustrating the execution of a programming test according to an exemplary embodiment.

FIG. 10 is a schematic diagram illustrating the execution of a programming test according to an exemplary embodiment. In the present exemplary embodiment, it is assumed that a physical erasing unit is selected for the programming test.

Referring to FIG. 10, a selected physical erasing unit 1010 includes physical programming units 1010(0) to 1010(7), among which the physical programming units 1010(1) and 1010(4) are bad physical programming units.

The memory control circuit unit 404 (or the memory management circuit 502) first performs a first programming operation on the physical erasing unit 1010. During the process of the first programming operation, the memory control circuit unit 404 (or the memory management circuit 502) performs the programming operation only on good physical programming units, while no data is programmed into bad physical programming units. In the present exemplary embodiment, the memory control circuit unit 404 (or the memory management circuit 502) programs the test data into all the good physical programming units, where the test data may be arbitrary data. Thus, after the first programming operation is performed, valid data is stored in good physical programming units of a physical erasing unit 1010', and no data is stored in bad physical programming units of the physical erasing unit 1010'. Then, the memory control circuit unit 404 (or the memory management circuit 502) issues a read command to read the valid data from the physical erasing unit 1010', checks whether any error occurs in the read valid data and calculates the number of error bits of the valid data to generate a testing result. In the present exemplary embodiment, when programming the good physical programming units, the memory control circuit unit 404 (or the memory management circuit 502) may program the test data to a data bit area of each good physical programming unit and program the corresponding ECC code to a redundant bit area of each good physical programming unit. Thus, the memory control circuit unit 404 (or the memory management circuit 502) checks the read valid data by the error checking and correcting circuit 512 using the ECC code. In the present exemplary embodiment, according to the testing result of the first programming operation, the memory control circuit unit 404 (or the memory management circuit 502) checks that errors occur in the valid data read from good physical programming units 1010'(0), 1010' (2) and 1010'(3) and calculates the number of the error bits (which is also referred to as a first error bit number) of the valid data where the errors occur.

Then, the memory control circuit unit 404 (or the memory management circuit 502) erases the data stored in the physical erasing unit 1010' to perform a second programming operation. During the process of the second programming operation, the memory control circuit unit 404 (or the memory management circuit 502) programs the test data into the good physical programming units and programs the dummy data into the bad physical programming units. After the second programming operation is performed, the valid data is stored in good physical programming units of a physical erasing unit 1010", and the dummy data is stored in bad physical programming units. Then, the memory control circuit unit 404 (or the memory management circuit 502) reads and checks the valid data stored in the physical erasing unit 1010". In the present exemplary embodiment, according to the testing result of the second programming operation, the memory control circuit unit 404 (or the memory management circuit 502) checks that an error occurs in the valid data read from a good physical programming unit 1010"(3) and calculates the number of the error bits (which is also referred to as a second error bit number) of the valid data where the error occurs.

Furthermore, the memory control circuit unit 404 (or the memory management circuit 502) compares the first error bit number with the second error bit number. If the first error bit number is greater than the second error bit number, it indicates that programming the dummy data into the bad physical programming units facilitates reducing probability of the errors occurring to the valid data. Accordingly, the memory control circuit unit 404 (or the memory management circuit 502) determines to program the dummy data into the bad physical programming units in the physical erasing unit when performing the writing operation. By contrast, if the first error bit number is not greater than the second error bit number, it indicates that programming the dummy data into the bad physical programming units results in the increase of the probability of the errors occurring to the valid data. Thus, the memory control circuit unit 404 (or the memory management circuit 502) determines not to program the dummy data into the bad physical programming units in the physical erasing unit when performing the writing operation.

In present exemplary embodiment, the memory control circuit unit 404 (or the memory management circuit 502) may calculate a sum of the number of the error bits of each valid data in the physical erasing unit and serve it as an error bit number corresponding to the physical erasing unit. However, the present invention is not limited thereto. The memory control circuit unit 404 (or the memory management circuit 502) may also calculate an average value of the number of the error bits of each valid data in the physical erasing unit and serve it as the error bit number corresponding to the physical erasing unit.

Additionally, in another exemplary embodiment, multiple physical erasing units may also be selected for the programming test. For example, the sum of all the first error bit numbers of the selected physical erasing units is compared with the sum of all the second error bit numbers. Alternatively, the average value of all the first error bit numbers of the selected physical erasing units is compared with the average value of all the second error bit numbers. The calculation of the error bit numbers is not limited in the present invention.

Figure 11:
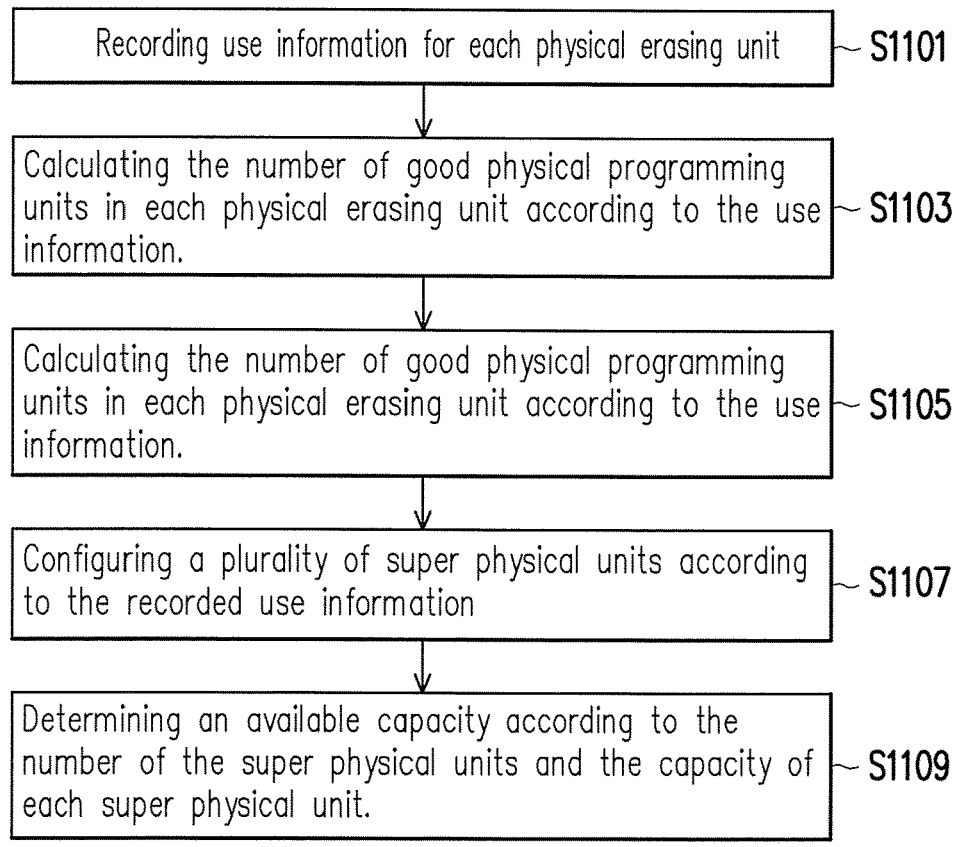
FIG. 11 is a flowchart illustrating a memory management method according to an exemplary embodiment.

FIG. 11 is a flowchart illustrating a memory management method according to an exemplary embodiment.

In step S1101, the memory control circuit unit 404 (or the memory management circuit 502) records use information for each physical erasing unit in the rewritable non-volatile memory module 406.

In step S1103, the memory control circuit unit 404 (or the memory management circuit 502) calculates the number of good physical programming units in each physical erasing unit according to the recorded use information.

In step S1105, the memory control circuit unit 404 (or the memory management circuit 502) determines a capacity of each super physical unit according to the minimum value among the calculated numbers.

In step S1107, the memory control circuit unit 404 (or the memory management circuit 502) configures a plurality of super physical units according to the recorded use information, wherein each super physical unit includes at least two physical erasing units, and an address offset value corresponding to at least one good physical programming unit of one of the physical erasing units in at least one of the super physical units is the same as an address offset value corresponding to at least one bad physical programming unit of the other physical erasing unit. Namely, the offset address values corresponding to the bad physical programming units in the at least two physical erasing units may be different.

In step S1109, the memory control circuit unit 404 (or the memory management circuit 502) determines an available capacity corresponding to the rewritable non-volatile memory module 406 according to the number of the configured super physical units and the capacity of each super physical unit.

Figure 12:
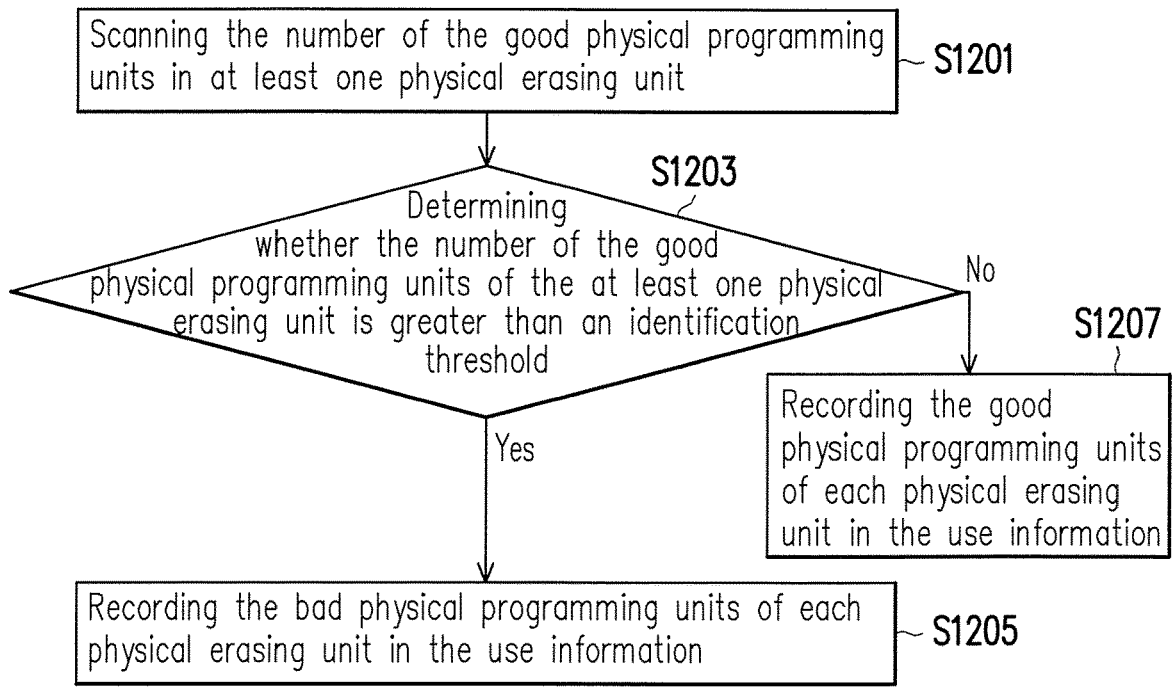
FIG. 12 is a flowchart illustrating the step of recording the use information according to an exemplary embodiment.

FIG. 12 is a flowchart illustrating the step of recording the use information according to an exemplary embodiment.

In step S1201, the memory control circuit unit 404 (or the memory management circuit 502) scans the number of the good physical programming units in at least one physical erasing unit in the rewritable non-volatile memory module 406.

In step S1203, the memory control circuit unit 404 (or the memory management circuit 502) determines whether the number of the good physical programming units of the at least one physical erasing unit is greater than an identification threshold.

If the number is greater than the identification threshold, in step S1205, the memory control circuit unit 404 (or the memory management circuit 502) records the bad physical programming units of each physical erasing unit in the use information.

If the number is not greater than the identification threshold, in step S1207, the memory control circuit unit 404 (or the memory management circuit 502) records the good physical programming units of each physical erasing unit in the use information.

Figure 13:
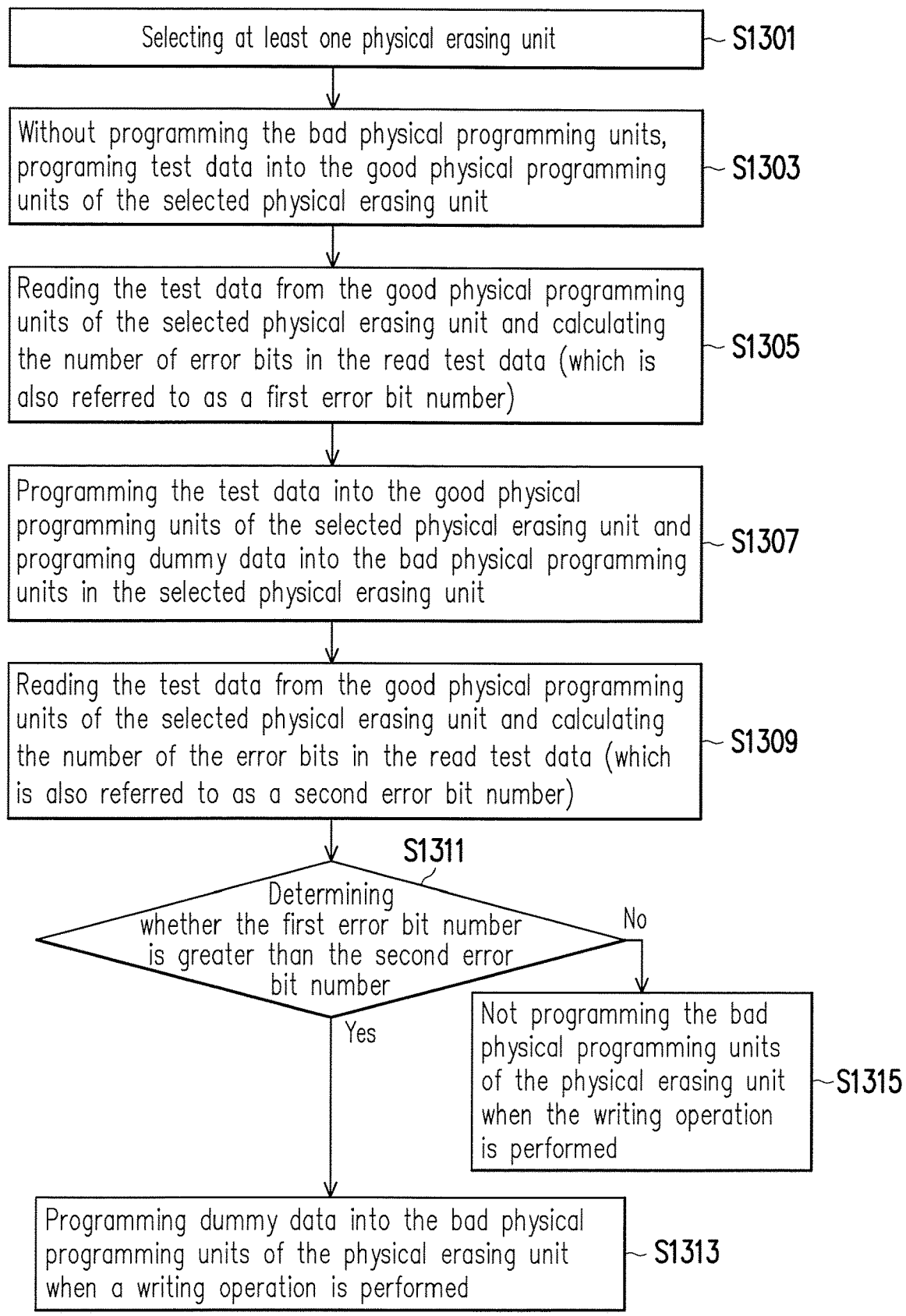
FIG. 13 is a schematic diagram illustrating the step of determining whether to write dummy data in the bad physical programming units according to an exemplary embodiment.

FIG. 13 is a schematic diagram illustrating the step of determining whether to write dummy data in the bad physical programming units according to an exemplary embodiment.

In step S1301, the memory control circuit unit 404 (or the memory management circuit 502) selects at least one physical erasing unit for the programming test and performs a programming test on the selected physical erasing unit.

Then, the memory control circuit unit 404 (or the memory management circuit 502) first performs a first programming operation on the selected physical erasing unit. Namely, in step 1303, the memory control circuit unit 404 (or the memory management circuit 502) programs the test data into the good physical programming units of the selected physical erasing unit, without programming the bad physical programming units.

In step S1305, the memory control circuit unit 404 (or the memory management circuit 502) reads the test data from the good physical programming units of the selected physical erasing unit and calculates the number of error bits in the read test data (which is also referred to as a first error bit number).

Then, the memory control circuit unit 404 (or the memory management circuit 502) performs a second programming operation on the selected physical erasing unit. Namely, in step S1307, the memory control circuit unit 404 (or the memory management circuit 502) programs the test data into the good physical programming units of the selected physical erasing unit and programs the dummy data into the bad physical programming units in the selected physical erasing unit. Before step 1307 is performed, the memory control circuit unit 404 (or the memory management circuit 502) may also perform an erasing operation on the selected physical erasing unit to erase the data stored in the selected physical erasing unit.

In step S1309, the memory control circuit unit 404 (or the memory management circuit 502) reads the test data from the good physical programming units of the selected physical erasing unit and calculates the number of the error bits in the read test data (which is also referred to as a second error bit number). The calculation of the error bit numbers has been described in the previous content and will not be repeated.

In step S1311, the memory control circuit unit 404 (or the memory management circuit 502) determines whether the first error bit number is greater than the second error bit number.

If the first error bit number is greater than the second error bit number, in step S1313, the dummy data is programmed into the bad physical programming units of the physical erasing unit when a writing operation is performed.

If the first error bit number is not greater than the second error bit number, in step S1315, the bad physical programming units of the physical erasing unit are not programmed when the writing operation is performed.

In the present exemplary embodiment, during the process of the programming test, the memory control circuit unit 404 (or the memory management circuit 502) does not program the bad physical programming units when the first programming operation is performed and then, programs the dummy data into the bad physical programming units when the second programming operation is performed. However, in another exemplary embodiment, the memory control circuit unit 404 (or the memory management circuit 502) may also program the dummy data into the bad physical programming units when the first programming operation is performed and then, does not program the bad physical programming units when the second programming operation is performed.

Based on the above, the present invention can contribute to correctly identifying the bad physical programming units in each physical erasing unit by means of recording the use information for each physical erasing unit in the rewritable non-volatile memory module. In this way, the address offset values corresponding to the bad physical programming units of each physical erasing unit can be different from one another, such that the number of the physical erasing units determined as the bad physical erasing unit can be reduced, and more available capacities can be determined. Moreover, by means of the super physical units configured according to the use information, the address offset values corresponding to the bad physical programming units in each of the at least two physical erasing units included in the super physical units can be different, such that the memory management can be more flexible.

Although the present invention has been disclosed by the above embodiments, they are not intended to limit the present invention. It will be apparent to one of ordinary skill in the art that modifications and variations to the present invention may be made without departing from the spirit and scope of the present invention. Therefore, the scope of the present invention will be defined by the appended claims.

What is claimed is:

1. A memory management method for a rewritable non-volatile memory module, wherein the rewritable non-volatile memory module comprises a plurality of physical erasing units, and each of the physical erasing units comprises a plurality of physical programming units, the memory management method comprising:
    recording use information for each of the physical erasing units, wherein the use information indicates unavailable physical programming units or available physical programming units of each of the physical erasing units; and
    configuring a plurality of super physical units according to the use information, wherein each of the super physical units comprises at least two of the physical erasing units,
    wherein the super physical units comprise a first super physical unit, the first super physical unit comprises a first physical erasing unit and a second physical erasing unit, the first physical erasing unit comprises a first unavailable physical programming unit, the second physical erasing unit comprises a first available physical programming unit, an address offset value corresponding to the first unavailable physical programming unit of the first physical erasing unit is the same as an address offset value corresponding to the first available physical programming unit of the second physical erasing unit, and the use information of the first physical erasing unit is different from the use information of the second physical erasing unit,
    wherein step of recording the use information for each of the physical erasing units comprises:
        scanning the number of available physical programming units of at least one physical erasing unit;
        if the number of the available physical programming units of the at least one physical erasing unit is not greater than an identification threshold, recording the available physical programming units of the physical erasing units in the use information; and
        if the number of the available physical programming units of the at least one physical erasing unit is greater than the identification threshold, recording the unavailable physical programming units of the physical erasing units in the use information.

2. The memory management method according to claim 1, wherein each of the super physical units comprises a plurality of super physical programming units, the first physical erasing unit comprises a second available physical programming unit, the second available physical programming unit of the first physical erasing unit and the first available physical programming unit of the second physical erasing unit are configured as a super physical programming unit of the first super physical unit, and an address offset value corresponding to the second available physical programming unit of the first physical erasing unit is different from the address offset value corresponding to the first available physical programming unit of the second physical erasing unit.

3. The memory management method according to claim 1, further comprising:
    obtaining an available capacity according to the use information, wherein the available capacity is calculated according to the number of the available physical programming units in each of the physical erasing units.

4. The memory management method according to claim 3, wherein the step of calculating the available capacity according to the use information comprises:
    obtaining the number of the available physical programming units in each of the physical erasing units according to the use information;
    determining a capacity of each of the super physical units according to a minimum value among the numbers; and
    determining the available capacity according to the number of the super physical units and the capacity of each of the super physical units.

5. The memory management method according to claim 1, further comprising:
    recording an identification flag to mark the physical programming units recorded in the use information as the available physical programming units or the unavailable physical programming units.

6. The memory management method according to claim 1, further comprising:
    selecting at least one physical erasing unit from the physical erasing units, wherein the at least one physical erasing unit comprises a plurality of available physical programming units and a plurality of unavailable physical programming units;
    programming test data into the available physical programming units of the at least one physical erasing unit without programming the unavailable physical programming units of the at least one physical erasing unit, reading data from the available physical programming units of the at least one physical erasing unit, and obtaining a number of error bits in the read data and serving the number as a first error bit number;
    programming the test data into the available physical programming units of the at least one physical erasing unit, programming dummy data into the unavailable physical erasing units of the at least one physical erasing unit, reading data from the available physical programming units of the at least one physical erasing unit, and obtaining a number of error bits in the read data and serving the number as a second error bit number; and if the first error bit number is greater than the second error bit number, programming the dummy data into the unavailable physical programming units of the physical erasing units when a writing operation is performed.

7. A memory control circuit unit for controlling a rewritable non-volatile memory module, wherein the rewritable non-volatile memory module comprises a plurality of physical erasing units, and each of the physical erasing units comprises a plurality of physical programming units, the memory control circuit unit comprising:
- a host interface configured to be coupled to a host system;
- a memory interface configured to be coupled to the rewritable non-volatile memory module; and
- a memory management circuit coupled to the host interface and the memory interface,
- wherein the memory management circuit is configured to record use information for each of the physical erasing units, wherein the use information indicates unavailable physical programming units or available physical programming units of each of the physical erasing units,
- wherein the memory management circuit is further configured to configure a plurality of super physical units according to the use information, wherein each of the super physical units comprises at least two of the physical erasing units,
- wherein the super physical units comprise a first super physical unit, the first super physical unit comprises a first physical erasing unit and a second physical erasing unit, the first physical erasing unit comprises a first unavailable physical programming unit, the second physical erasing unit comprises a first available physical programming unit, and an address offset value corresponding to the first unavailable physical programming unit of the first physical erasing unit is the same as an address offset value corresponding to the first available physical programming unit of the second physical erasing unit,
- wherein the memory management circuit is further configured to scan the number of available physical programming units of at least one physical erasing unit,
- wherein if the number of the available physical programming units of the at least one physical erasing unit is not greater than an identification threshold, the memory management circuit is further configured to record the available physical programming units of the physical erasing units in the use information, and
- wherein if the number of the available physical programming units of the at least one physical erasing unit is greater than the identification threshold, the memory management circuit is further configured to record the unavailable physical programming units of the physical erasing units in the use information.

8. The memory control circuit unit according to claim 7, wherein each of the super physical units comprises a plurality of super physical programming units, the first physical erasing unit comprises a second available physical programming unit, the second available physical programming unit of the first physical erasing unit and the first available physical programming unit of the second physical erasing unit are configured as a super physical programming unit of the first super physical unit, and an address offset value corresponding to the second available physical programming unit of the first physical erasing unit is different from the address offset value corresponding to the first available physical programming unit of the second physical erasing unit.

9. The memory control circuit unit according to claim 7, wherein the memory management circuit is further configured to obtain an available capacity according to the use information, wherein the available capacity is obtained according to the number of the available physical programming units in each of the physical erasing units.

10. The memory control circuit unit according to claim 9, wherein the memory management circuit is further configured to obtain the number of the available physical erasing units in each of the physical erasing units according to the use information,
- wherein the memory management circuit is further configured to determine a capacity of each of the super physical units according to a minimum value among the numbers,
- wherein the memory management circuit is further configured to determine the available capacity according to the number of the super physical units and the capacity of each of the super physical units.

11. The memory control circuit unit according to claim 7, wherein the memory management circuit is further configured to record an identification flag to mark the physical programming units recorded in the use information as the available physical programming units or the unavailable physical programming units.

12. The memory control circuit unit according to claim 7, wherein the memory management circuit is further configured to select at least one physical erasing unit from the physical erasing units, wherein the at least one physical erasing unit comprises a plurality of available physical programming units and a plurality of unavailable physical programming units,
- wherein the memory management circuit is further configured to program test data into the available physical programming units of the at least one physical erasing unit without programming the unavailable physical programming units of the at least one physical erasing unit, read data from the available physical programming units of the at least one physical erasing unit, and obtain a number of error bits in the read data and serve the number as a first error bit number,
- wherein the memory management circuit is further configured to program the test data into the available physical programming units of the at least one physical erasing unit, program dummy data into the unavailable physical erasing units of the at least one physical erasing unit, read data from the available physical programming units of the at least one physical erasing unit, and obtain a number of error bits in the read data and serve the number as a second error bit number,
- wherein if the first error bit number is greater than the second error bit number, the memory management circuit is further configured to program the dummy data into the unavailable physical programming units of the physical erasing units when a writing operation is performed.

13. A memory storage device, comprising:
- a connection interface unit configured to be coupled to a host system;
- a rewritable non-volatile memory module comprising a plurality of physical erasing units; and
- a memory control circuit unit coupled to the connection interface unit and the rewritable non-volatile memory module,
- wherein the memory control circuit unit is configured to record use information for each of the physical erasing units, wherein the use information indicates unavailable physical programming units or available physical programming units of each of the physical erasing units, wherein the memory control circuit unit is further configured to configure a plurality of super physical units according to the use information, wherein each of the super physical units comprises at least two of the physical erasing units, wherein the super physical units comprise a first super physical unit, the first super physical unit comprises a first physical erasing unit and a second physical erasing unit, the first physical erasing unit comprises a first unavailable physical programming unit, the second physical erasing unit comprises a first available physical programming unit, and an address offset value corresponding to the first unavailable physical programming unit of the first physical erasing unit is the same as an address offset value corresponding to the first available physical programming unit of the second physical erasing unit, wherein the memory control circuit unit is further configured to select at least one physical erasing unit from the physical erasing units, wherein the at least one physical erasing unit comprises a plurality of available physical programming units and a plurality of unavailable physical programming units, wherein the memory control circuit unit is further configured to program test data into the available physical programming units of the at least one physical erasing unit without programming the unavailable physical programming units of the at least one physical erasing unit, read data from the available physical programming units of the at least one physical erasing unit, and obtain a number of error bits in the read data and serve the number as a first error bit number, wherein the memory control circuit unit is further configured to program the test data into the available physical programming units of the at least one physical erasing unit, program dummy data into the unavailable physical erasing units of the at least one physical erasing unit, read data from the available physical programming units of the at least one physical erasing unit, and obtain a number of error bits in the read data and serve the number as a second error bit number, and wherein if the first error bit number is greater than the second error bit number, the memory control circuit unit is further configured to program the dummy data into the unavailable physical programming units of the physical erasing units when a writing operation is performed.

14. The memory storage device according to claim 13, wherein each of the super physical units comprises a plurality of super physical programming units, the first physical erasing unit comprises a second available physical programming unit, the second available programming unit of the first physical erasing unit and the first available physical programming unit of the second physical erasing unit are configured as a super physical programming unit of the first super physical unit, and an address offset value corresponding to the second available programming unit of the first physical erasing unit is different from the address offset value corresponding to the first available physical programming unit of the second physical erasing unit.

15. The memory storage device according to claim 13, wherein the memory control circuit unit is further configured to obtain an available capacity according to the use information, and wherein the available capacity is obtained according to the number of available physical programming units in each of the physical erasing units.

16. The memory storage device according to claim 15, wherein the memory control circuit unit is further configured to obtain the number of the available physical erasing units in each of the physical erasing units according to the use information, wherein the memory control circuit unit is further configured to determine a capacity of each of the super physical units according to a minimum value among the numbers, wherein the memory control circuit unit is further configured to determine the available capacity according to the number of the super physical units and the capacity of each of the super physical units.

17. The memory storage device according to claim 13, wherein the memory control circuit unit is further configured to scan the number of available physical programming units of at least one physical erasing unit, wherein if the number of the available physical programming units of the at least one physical erasing unit is not greater than an identification threshold, the memory control circuit unit is further configured to record the available physical programming units of the physical erasing units in the use information, and wherein if the number of the available physical programming units of the at least one physical erasing unit is greater than the identification threshold, the memory control circuit unit is further configured to record the unavailable physical programming units of the physical erasing units according in the use information.

18. The memory storage device according to claim 17, wherein the memory control circuit unit is further configured to record an identification flag to mark the physical programming units recorded in the use information as the available physical programming units or the unavailable physical programming units.

* * * * *